United States Patent
Bien et al.

(10) Patent No.: US 7,178,463 B2
(45) Date of Patent: *Feb. 20, 2007

(54) INTERIOR CONTOUR FOR BORE OF A FRICTION SUPPORT BEARING OF A RAILWAY LOCOMOTIVE TRACTION MOTOR

(75) Inventors: Paul Bien, Downers Grove, IL (US); Robert B. Foster, Erie, PA (US); John E. Macklin, Fremont, NE (US)

(73) Assignee: Magnus Division of LV Ventures, Inc., Fremont, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/401,177

(22) Filed: Apr. 10, 2006

(65) Prior Publication Data

US 2006/0174796 A1    Aug. 10, 2006

(51) Int. Cl.
B61C 17/00 (2006.01)
F16C 27/00 (2006.01)
(52) U.S. Cl. .................... 105/136; 384/215
(58) Field of Classification Search ........... 105/136, 105/133, 103; 384/215, 286, 281
See application file for complete search history.

(56) References Cited

U.S. PATENT DOCUMENTS

| | | |
|---|---|---|
| 798,237 A | 8/1905 | Van Valkenburg |
| 902,017 A | 10/1908 | Stowe |
| 1,314,500 A | 9/1919 | Broomall et al. |
| 1,816,474 A | 7/1931 | Eaton |
| 2,204,515 A | 6/1940 | Stahlecker |
| 2,323,662 A | 7/1943 | Jenkins et al. |
| 2,543,154 A | 2/1951 | Cox |
| 2,574,318 A | 11/1951 | Burkhardt |
| 3,662,858 A | 5/1972 | Peterson |
| 3,765,734 A | 10/1973 | Peterson |
| 4,075,950 A | 2/1978 | Marta et al. |
| 4,249,993 A | 2/1981 | Stegelitz et al. |
| 4,603,865 A | 8/1986 | Bien |

(Continued)

FOREIGN PATENT DOCUMENTS

DE    3144720    5/1983

*Primary Examiner*—S. Joseph Morano
*Assistant Examiner*—Robert J. McCarry, Jr.
(74) *Attorney, Agent, or Firm*—Much, Shelist, Freed; Milton S. Gerstein (57) ABSTRACT

A contour or profile of a bore of a locomotive traction-motor support bearing structure, where such profile preserves the currently center-loading of the upper load zone but moves inboardly the lower load zone to a more general central location. The profile of the bore for the support bearing, according to the invention, takes into account not only truck-axle bending due to locomotive weight, but also that from motor tilt through bearing clearances, and couple action on the axle from heavy radial loads on PE support bearing and adjacent axle gear. The bore is configured such that the upper surface is horizontal, but the lower surface slopes downwardly in the outboard direction at an angle based on a function dependent upon the three misalignment factors. In a preferred embodiment, the bore mid-section is defined as a frustroconical section of a cone with an altitude having a slope of substantially $1 \times M1$ to the horizontal, and an apex angle of substantially $\arctan 2 \times M1$, where M1 is the value of the misalignment factor associated with the locomotive load on the axle.

21 Claims, 3 Drawing Sheets

U.S. PATENT DOCUMENTS

| | | |
|---|---|---|
| 4,628,824 A | 12/1986 | Goding et al. |
| 4,940,002 A | 7/1990 | Bien |
| 4,995,735 A | 2/1991 | Dansdill |
| 5,136,766 A | 8/1992 | Savitz |
| 5,601,370 A | 2/1997 | Shibayama et al. |
| 5,913,608 A | 6/1999 | Blume |
| 6,468,194 B2 | 10/2002 | Wojtkowski et al. |
| 6,626,063 B2 | 9/2003 | Killion |
| 7,055,439 B2 * | 6/2006 | Bien et al. .................. 105/136 |

* cited by examiner

FIG. 1

PRIOR ART

INTERIOR CONTOUR FOR BORE OF A FRICTION SUPPORT BEARING OF A RAILWAY LOCOMOTIVE TRACTION MOTOR

BACKGROUND OF THE INVENTION

The present invention is directed to a railway locomotive traction motor and, in particular, to the friction support bearing by which the traction motor is partially supported on the axle of the railway truck mounting the underside of the locomotive, and, in particular, to a method of customizing the geometry or bore-profile of a traction motor support-bearing bore in order to optimize alignment with the locomotive axle journal under heavy load conditions, and to thus increase bearing load capacity and bearing life under heavy load conditions.

Proper alignment between the support bearing and the truck axle journal is important for maintaining good bearing performance, because it provides maximum contact between journal and bearing to thus insure minimum unit loading (lbs/sq.in.). This allows the bearing to carry heavier radial loads or the same radial load with greater reliability. This applies to both pinion end (PE) and commutator end (CE) bearings, although it is not as important at the CE position because of the light radial loading at this location.

It is, also, common practice to use the same type of support bearing for both the pinion end and commutator end. Thus, since the greater radial load occurs at the pinion end, such a support bearing must be so designed so as to withstand the greater wear at the pinion end. This current parts-interchangeability requirement of support bearings for use at either pinion end or commutator end, therefore, results in a bearing which is acceptable for either position, but optimum for neither position. Therefore, it is current practice to use identical support bearings at both the heavily loaded PE position and the lesser-loaded CE position for locomotive traction motors equipped with plain friction bearings. Thus, when providing a new type of bore for a support bearing for a locomotive truck axle, ideally one would optimize the bearing bore for the misalignment conditions existing at the PE position, and do this in a way which allows continued use at the CE position, even though not optimized for that lesser-loaded bearing position.

The primary cause of support bearing misalignment is bending due to locomotive weight, and this factor alone theoretically should tend to cause the upper load zone of the support bearing to move an in inboard direction away from the center position of the support-bearing bore, while also causing the lower load zone thereof to move to an outboard location away from the center position of bore. However, in actual use, it has been found that such does not actually occur at the PE; instead, it has been found that upper load zone remains generally centrally-located while the lower load zone does move off-center toward the outboard end of the support bearing. The problem has been to understand why this occurs, and then to develop a bore-contour or profile consistent with the findings as to the additional bending torques present causing the shift of the load zones from the expected, which contour will preserve the existing ideal location of the upper load zone while moving the lower zone into a central position.

In U.S. Pat. No. 4,940,002, which is incorporated by reference herein, there is disclosed a friction support bearing having, in a first version, a skewed or tilted internal bore design, which bore design more accurately positions the truck axle journal therein during heavy load conditions. This prior-art bore design takes into consideration the torque and bending loads of the truck axle arising from the laterally-spaced radial forces emanating from the weight of the locomotive acting on the journal box bearings at the end of the axle and the reactive force of the rail track acting on the wheel mounted by the axle, which bending of the axle directly causes misalignment of the axle portion extending through the traction-motor friction support bearing with the bore of the support bearing. This misalignment causes excessive loading and wear of the support bearing on the pinion-end thereof adjacent the axle's drive gear. However, while this prior-art bore-design may help to alleviate some excessive load concentration on the pinion-end of the support bearing, it has not completely solved the problem. In a second version U.S. Pat. No. 4,940,002, there is disclosed forming the interior bore as variable or changing conical sections, where there are actually four separate conical sections employed. In this second version, there is provided an upper central portion of the bore that is a substantially horizontal line or surface, when viewed in vertical cross section, while the lower or bottom central portion of the bore is somewhat sloped.

Figure 1:
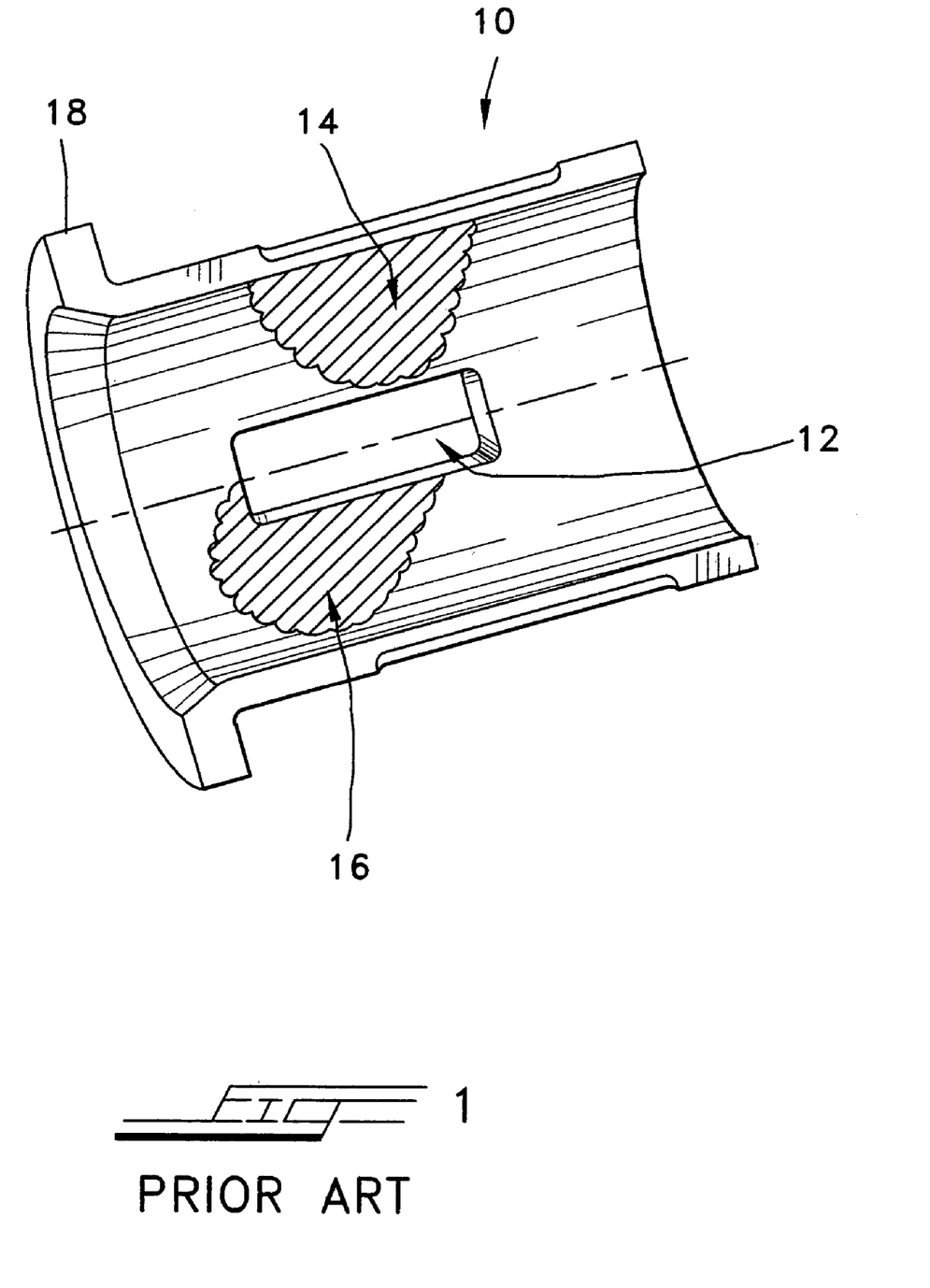
FIG. 1 is an isometric view of a typical, PE window half, used, prior-art, locomotive traction-motor pinion-end support bearing having a cylindrical bore and showing the locations of the upper and lower load-bearing zones thereof.

The loading of a typical, prior-art traction-motor pinion-end support bearing having a standard cylindrical bore without the improved bore-profile of above-mentioned U.S. Pat. No. 4,940,002, is shown in FIG. 1. For best overall performance and life of a traction-motor support bearing 10, the load zones for loading the truck axle should be centered. This is so in order that the lubricant entering the interior of the bearing via a wick window 12 lubricates all contacting surface-areas, which wick lubricator contacts the axle's journal through the window. In addition, both load zones should be contained within the total axial dimension of the wick if at all possible, again to ensure the best possible lubrication. The example shown in of FIG. 1 is for plain friction support bearings from traction motors with 8" nominal diameter axles, with approximately 60,000 to 70,000 pounds axle load and standard gauge wheel spacing. This combination of parameters has an axle bending slope of about 0.001 inch/inch at the mid-length portion of the PE bearing. Each PE traction-motor support bearing 10 has two load zones, an upper 14 and a lower 16, and these tend to be heaviest around 25° from vertical because of commonly-used 25° gear-tooth pressure angle. Both load-contact patterns can be seen in the window half of the PE bearing with the upper load pattern above the lubricator access-window and the lower load pattern below the window. The axial location of these contact-patterns is of particular interest, since it is key to understanding the misalignment existing between the axle-journal and the support bearing. It may be seen in FIG. 1 that the upper load contact-pattern is well centered in the bearing length, while the lower load contact-pattern is displaced outwardly, or outboardly toward the bearing flange. Ideally, both upper and lower load contact-patterns should be centered at mid-length of the window, in order that the wick lubricator, which contacts the journal through the window, provides the best possible lubrication. Further, both load contact-patterns should be contained within the total axial dimension or limits of the wick lubricator if at all possible, again to ensure the best possible lubrication. As may be seen in FIG. 1, only the upper load zone is centered.

While used prior-art cylindrical-bore bearings have exhibited an upper load-zone 14 that is centered, such is not the case for the lower load-zone 16, which is skewed toward the outboard end, or bearing flange. Both load zones 14, 16 are actually visible in the window half of a PE bearing, with the upper load zone above the window and the lower load zone below the window. The above-described and shown load-patterns have been observed on General Motor's Electric Motor Division (EMD) traction motors, such as that disclosed in above-mentioned U.S. Pat. No. 4,940,002, with 8" diameter axles and standard gauge wheel spacing.

Neither version disclosed in above-mentioned U.S. Pat. No. 4,940,002 is effective in solving the misalignment of the lower load zone 16. This is so since the bore-profile of U.S. Pat. No. 4,940,002 only takes into account axle-bending torques associated with locomotive weight. However, according to the present invention, it has been discovered that other loads and torques are present that cause axle-bending and concomitant load-bearing misalignment, which hitherto have not been taken into account into the consideration of a traction-motor support-bearing bore profile.

SUMMARY OF THE INVENTION

It is a primary objective of the present invention to provide an improved interior contour or profile for a friction support bearing of a locomotive traction motor that more realistically takes into account all bending moments of the truck axle on which the traction motor is partially mounted, in order to minimize or eliminate misalignment between the support bearing bore and the truck-axle journal, and thus the misalignment of the upper and lower load zones of the support bearing. It is also a primary objective of the present invention to maintain the generally centralized location of the upper load zone of a friction support bearing of a locomotive traction motor exhibited by presently-used support bearings, while better aligning the lower load zone thereof to a central, or more central, location.

It is also a primary objective of the present invention to achieve an interior bore-contour or profile for a friction support bearing of a locomotive traction motor such that such profile may also, under certain circumstances, be used for the bore of a commutator-end (CE) friction support bearing without adversely affecting the performance of the CE support bearing, whereby one, standard, traction-motor friction support bearing may be used and stocked for either the PE or CE end of the traction motor support structure It is also a primary objective of the present invention to achieve an interior bore-contour or profile for a friction support bearing of a locomotive traction motor such that such profile thereof takes into account torques forces associated with the causing of the bending of the truck axle that include axle bending due, not only from locomotive weight, but also those derived from motor tilt through bearing clearances and couple action on the axle deriving from the heavy radial loads on the PE support bearing and the laterally-juxtapositioned axle gear engaged with the pinion gear of the traction motor at the PE end thereof.

According to the present invention, the contour or profile for the bore of a locomotive traction-motor support bearing structure is an improvement over that disclosed in U.S. Pat. No. 4,940,002, and is such as to preserve the currently-centered loading for the upper load zone but to move inboardly the lower load zone to a more general central location. The profile of the bore for the support bearing, according to the invention, takes into account not only truck-axle bending due to locomotive weight, but also that from motor tilt through bearing clearances, and couple acting on the axle from heavy radial loads on PE support bearing and adjacent axle gear. According to the invention, it has been discovered that the latter two axle-bending factors counteract the first factor in the upper load-bearing zone, which has accounted for the generally centrally-located positioning of the upper load zone, as described above. In contrast, however, the latter two axle-bending factors combine with the first axle-bending factor to increase misalignment in the lower load-bearing zone; hence, the observed outboard-direction misalignment of the lower load-bearing zone described above.

BRIEF DESCRIPTION OF THE DRAWINGS

The invention will be more readily understood with reference to the accompanying drawings, wherein.

DETAILED DESCRIPTION OF THE INVENTION

Referring now to the drawings in greater detail, the bore design for the friction support bearing of the invention is intended, in the preferred embodiment, for use with a locomotive traction-motor manufactured by the Electric Motor Division of General Motors Corporation, as disclosed in above-discussed U.S. Pat. No. 4,940,002. This traction motor has a pinion-end friction support bearing with a bore for passing therethrough the lubricated axle-journal by which the traction motor is partially mounted to the truck. The traction motor is also partially supported by the friction support bearing at the commutator end, and by direct mounting to the transoms of the truck through a resilient suspension. This locomotive traction-motor is used with a railway locomotive having an eight-inch axle and standard gauge wheel-spacing, and approximately 60,000–70,000 pounds of axle load, and which has exhibited an approximately 0.001 inch/inch axle-bending slope at the mid-length of the PE support bearing due to locomotive weight alone.

As discussed hereinabove, the bore-design of U.S. Pat. No. 4,940,002 only takes into consideration the effects on axle-bending from locomotive weight. However, it has been discovered that other factors contribute to axle-bending which have not been taken into account by the bore-design in this patent. These other factors have been discovered to be the combined effects of motor tilt and skewing because of bearing clearances, "couple" acting on the axle because of the heavy radial loads on PE support bearing and the adjacent axle-gear thereat, and also axle-bending due to tractive-effort forces and gear-separating forces acting in the horizontal plain.

Figure 2A:
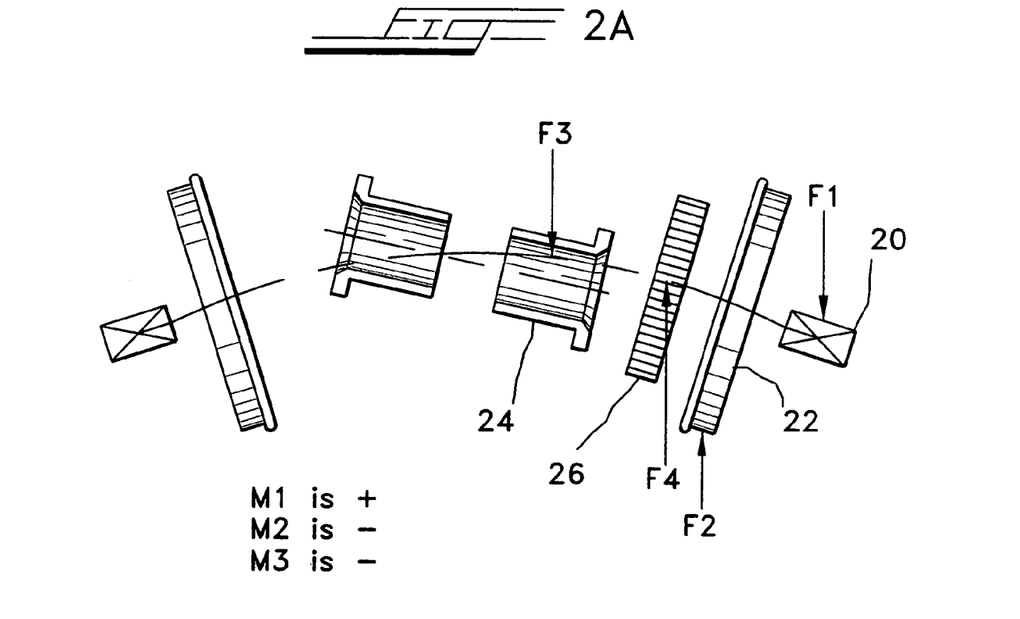
FIG. 2A is a diagram showing all the additional torques acting in a vertical plane on the locomotive truck axle causing bending moments that affect the location of the upper load zone of a locomotive truck friction support bearing.
Figure 2B:
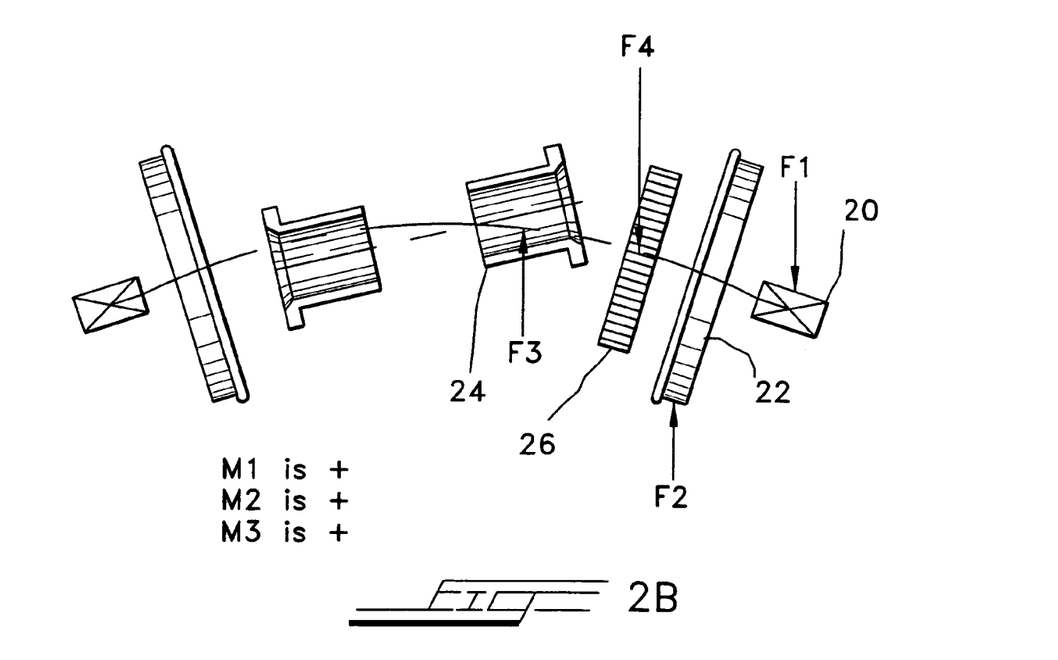
FIG. 2B is a diagram similar to FIG. 2B but showing all the additional torques acting in a vertical plane on the locomotive truck axle causing bending moments that affect the location of the lower load zone of a locomotive truck friction support bearing.

Referring now to FIGS. 2A and 2B, misalignment caused by the axle-bending forces or torque caused by the locomotive weight is indicated by reference symbol M1; misalignment caused by motor tilt and skewing through bearing clearances is indicated by reference symbol M2; that caused by "couple" acting on the axle from heavy radial loads on the PE support bearing and adjacent axle gear is indicated by reference symbol M3. Axle-bending caused by tractive-effort forces and gear-separating forces acting in the horizontal plain have, for all intents and purposes, been ignored, however, with only the major factors causing misalignment in the vertical plane having been considered, which is the dominant plane of misalignment. The misalignment M1 caused by locomotive weight derives from the horizontal spacing between the forces F1 and F2 created by the locomotive weight acting on the journal box 20 and the reaction force acting on the wheel 22 from the rail. The second factor causing misalignment M2 derives from the simple tilting and skewing of the motor 30 because of bearing clearances.

The third factor causing misalignment M3 caused by couple derives from the horizontal spacing between the vertical forces F3 and F4 acting on the support bearing 24 from the heavy radial loads and the juxtapositioned driven axle-gear 26 that is driven by the traction motor's pinion gear.

FIGS. 2A and 2B show the relative deflections and principle loading of the locomotive axle in a vertical plane for both forward and reverse directions, and both modes of operation, which are the power mode and dynamic-brake mode, which dynamic-brake mode is accomplished via the traction motor itself. The sense, or angular direction, of these components of total misalignment varies with direction of operation and whether in power mode or dynamic-brake mode of locomotive operation. FIG. 2A shows the factors effecting misalignment in the upper load zone (14 in FIG. 1), while FIG. 2B shows the same for the lower load zone (16 in FIG. 1). It is to be understood that the factors causing misalignment in the power mode in the one direction would be of similar value and sense, or angular direction, as in the dynamic-brake mode in the opposite direction, as indicated in FIGS. 2A and 2B. Thus, the force vectors shown in FIG. 2A for M2 apply to the power mode in forward operation or to the dynamic-brake mode in the reverse direction. The force vectors shown in FIG. 2B apply to the power mode in the reverse operation or to the dynamic-brake mode in the forward direction. The same holds true for misalignment contributor M3.

In FIGS. 2A and 2B, the misalignment M1 from locomotive weight has been assigned a positive, or "+", sense to the misalignment slope at the midpoint of the PE bearing. Considering the other two dominant factors of misalignment in the vertical plane, misalignment M2, which is the effect of motor tilt in bearing clearances, and M3, the effect of couple created by adjacent gear and support bearing loads, these have been assigned either "+" or "−" sense according to whether these components add to, or reduce, the misalignment caused by axle-bending, respectively. Thus, in FIG. 2A, since these factors M2 and M3 counteract torque M1 for the upper load-zone, and thereby reduce misalignment, they have been indicated as negative values. However, in FIG. 2B, since factors M2 and M3 add to torque M1 for the lower load-zone 16, and thereby increase misalignment, they have been indicated as positive values.

The total misalignment M is the vector sum or combination of the three components, M1 M2 and M3. As discussed hereinabove, examination of upper and lower load-patterns in used bearings has determined that, when the bearing is loaded in its upper load zone (FIG. 2A), the total misalignment M is approximately zero, since the load pattern is centrally located. Thus:

$$M=M1-M2-M3=0$$

which means that:

$$M1=M2+M3.$$

For the lower load-zone (FIG. 2B), for total misalignment:

$$M=M1+M2+M3.$$

From the upper load-zone analysis, it is known that M1=M2+M3, resulting in the conclusion for the lower load zone that:

$$M=2\times M1.$$

While for simplicity sake, the above analysis has been presented as equations, it is to be understood that these are actually vector approximations.

Figure 3:
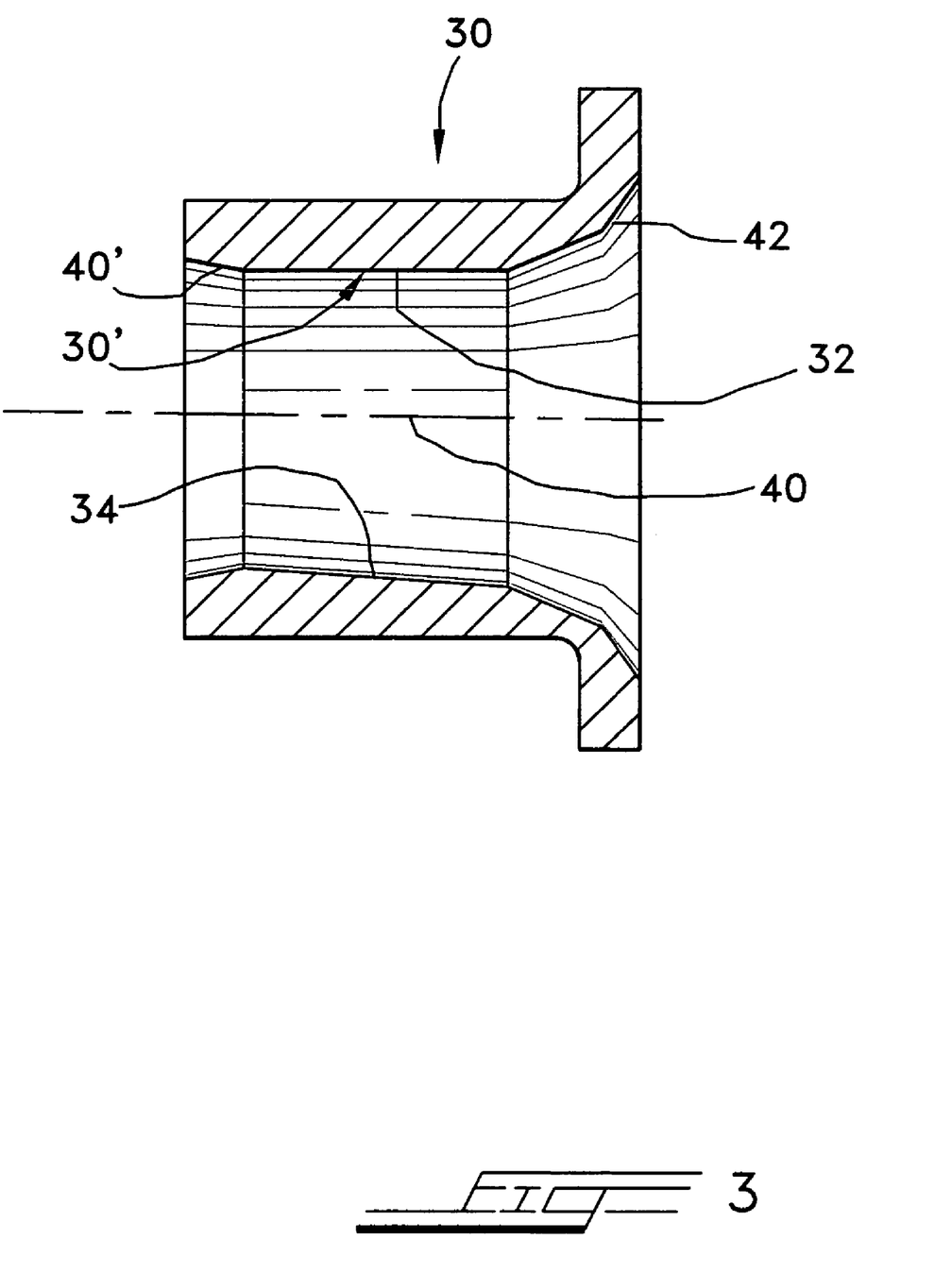
FIG. 3 is a sectional view showing the contour of bore of the support bearing of the invention.

Referring now to FIG. 3, there is shown the bore profile of the support bearing 30 in accordance with the present invention. In the light of the above-analysis, the optimum bore-contour for the support bearing in a vertical cross-sectional plane is described by a horizontal or non-sloping line or surface 32 at top, or upper portion, or half, of the bore of the bearing, since examination of used bearings has shown that the load zone with such a configuration is already substantially centered. It also follows from the analysis described hereinabove that the optimum bore-contour for the support bearing in a vertical cross-sectional plane is a sloping line or surface 34 at the bottom, or lower, portion, or half, of the bore, which slope is equal to the total misalignment M, which is a correction of 2×M1, as described above. The support bearing 30 is still provided with the flared or conical ends 40, 42 as disclosed and discussed in above-discussed U.S. Pat. No. 4,940,002. As mentioned above, for an eight-inch truck axle, and a locomotive weight of between 60,000–70,000, M has been determined to be approximately 0.001 inch/inch. Therefore, in the preferred embodiment, the slope of lower surface 34 would be 0.002 inch/inch.

It is, however, to be understood that the slope of the lower surface 34 of the bore 30 may be varied depending upon the type of traction motor that is to be used, the weight of the locomotive, and the diameter of the axle. However, in all cases, the slope of the lower surface will be based on a combination of the three factors M1, M2 and M3, which factors may change owing to these variables of type of traction motor used, locomotive weight, and axle-diameter.

Referring again to FIG. 3, the contour of the mid-section of the interior bore 30' of the support bearing 30 may best be described as a non-right, or acute-angle, cone, of which the center section of the bore 30' is the frustroconical section of the cone. This cone is uniquely defined by an altitude 40 having a slope of 1×M1 to the horizontal, and an apex angle equal to arctan 2×M1.

While the above-description has been directed to a traction motor manufactured by the EMD of General Motors Corp., the same analysis and basic bore-configuration of the invention also applies to a traction motor made by the General Electric Company. In the case of the GE traction motor, the application thereof for use in a locomotive of the same wheel spacing, same approximate range of axle-loads, same general arrangement of bearings, gears and other parts. The main difference is that the standard GE axle is 9" while that for GM is 8", and that the GE bearing length is approximately three inches shorter, about 9" for the GE bearing and 12" for EMD bearing. Axial dimension of the GE wick and window is also, therefore, correspondingly shorter. Moreover, in the GE case, axle-bending M1 would likely be a little less on account of a larger diameter axle. While this GE support bearing has a convex-crowned central bore rather than a cylindrical central bore as in the GM version, the end-relief sections are similar to the GM version. This convex-crowned central bore may be reworked into a cone with concave sides having a skewed axis for using the present invention therewith.

The bore of the support bearing of the present invention may have application in other areas and uses, such as the outer-ring roller path of rolling-element bearings in the traction-motor environment, and to both plain and roller bearings in other traction motor applications with various axle diameters, axle loading, and wheel gauges, as well as to both plain and rolling element bearings in other applications, by making appropriate adjustments for variations in types and additional factors in the combination of shaft misalignment. These other potential applications may include marine and mining equipment, power generation equipment, construction equipment, and other heavy duty, military, and industrial bearing applications.

While a specific embodiment of the invention have been shown and described, it is to be understood that numerous changes and modifications may be made therein without departing from the scope and spirit of the invention as set forth in the appended claims.

What is claimed is:

1. In a locomotive traction-motor support bearing having a bore for mounting the traction motor to a truck-axle journal, said bore having an upper surface section and a lower surface section, each said upper surface section and said lower surface section defining a middle portion thereof; said middle portion of said upper surface section being substantially horizontal, and said middle portion of said lower surface section having a downward slope in the outboard direction, wherein the improvement comprises:
    said downward slope of said middle portion of said lower surface section having a value based on the values of at least the lower the load-bearing misalignment factors of: locomotive weight M1, motor tilt and skewing M2, and couple-action M3 on the truck-axle.

2. The locomotive traction-motor support bearing according to claim 1, wherein said slope is approximately equal to 2×M1.

3. The locomotive traction-motor support bearing according to claim 2, wherein said middle portions are defined as the frustroconical section of a cone with an altitude having a slope of substantially 1×M1 to the horizontal, and an apex angle of substantially arctan 2×M1.

4. The locomotive traction-motor support bearing according to claim 1, wherein said middle portions are defined as the frustroconical section of a cone with an altitude having a slope of substantially 1×M1 to the horizontal, and an apex angle of substantially arctan 2×M1.

5. The locomotive traction-motor support bearing according to claim 1, wherein said slope is approximately equal to 0.002 inch/inch.

6. The locomotive traction-motor bearing according to claim 4, wherein said slope of said middle portion of said lower surface section is approximately equal to 0.002 inch/inch.

7. In a locomotive traction-motor support bearing having a bore for mounting the traction motor to a truck-axle journal, said bore having an upper surface section and a lower surface section, each said upper surface and said lower surface section defining a middle portion thereof; said middle portion of said upper surface section being substantially horizontal, and said middle portion of said lower surface section having a downward slope in the outboard direction, wherein the improvement comprises:
    said downward slope of said middle portion of said lower surface section having a value of approximately 2×M1, where M1 is the value of the locomotive-weight misalignment factor.

8. The locomotive traction-motor support bearing according to claim 7, wherein said middle portions are defined as the frustroconical section of a cone with an altitude having a slope of substantially 1×M1 to the horizontal, and an apex angle of substantially arctan 2×M1.

9. The locomotive traction-motor support bearing according to claim 7, wherein said downward slope of said middle portion of said lower surface section is a function of misalignment M, $f(M)$, wherein $f(M)$ is at least directly correlated with values of at least two factors of misalignment, one said factor of misalignment being caused by locomotive weight, and one said factor of misalignment being caused by couple-action on the truck-axle.

10. The locomotive traction-motor support bearing according to claim 9, wherein $f(M)$ is also directly correlated with the value of an additional factor of misalignment caused by motor tilt and skewing due to bearing clearances.

11. In a locomotive traction-motor support bearing having a bore for mounting the traction motor to a truck-axle journal, said bore having an upper surface section and said a lower surface section, each said upper surface section and lower surface section defining a middle portion thereof; said middle portion of said upper surface section being substantially horizontal, and said middle portion of said lower surface section having a downward slope in the outboard direction, wherein the improvement comprises:
    said downward slope of said middle portion of said lower surface section is a function of misalignment M, $f(M)$, wherein $f(M)$ is correlated with values M1 and M2, where M1 is misalignment caused by locomotive weight, and M2 is misalignment caused by motor tilt and skewing due to bearing clearances.

12. The locomotive traction-motor support bearing according to claim 11, wherein $f(M)$ is also directly correlated with value M3, where M3 is misalignment caused by couple-action on the truck-axle.

13. The locomotive traction-motor support bearing according to claim 11, wherein said slope is approximately equal to 2×M1.

14. The locomotive traction-motor support bearing according to claim 11, wherein said middle portions are defined as the frustroconical section of a cone with an altitude having a slope of substantially 1×M1 to the horizontal, and an apex angle of substantially 2×M1.

15. The locomotive traction-motor support bearing according to claim 14, wherein said slope is approximately equal to 0.002 inch/inch.

16. In a support bearing having a bore for receiving an axle element means, said bore having an upper surface section and a lower surface section, each said upper surface section and said lower surface section defining a middle portion thereof, the improvement comprising:
    said middle portion of said upper surface section being substantially horizontal, and said middle portion of said lower surface section having a downward slope as a function of misalignment M, $f(M)$, wherein $f(M)$ is directly correlated with at least misalignment values M1 and M2, where M1 is misalignment caused by load-weight on said axle, and M2 is misalignment caused by motor tilt and skewing due to support bearing clearances.

17. The support bearing having a bore for receiving an axle element means according to claim 16, wherein said slope is at least approximately equal to 2×M1.

18. The locomotive traction-motor support bearing according to claim 16, wherein said middle portions are defined as the frustroconical section of a cone with an altitude having a slope of substantially 1×M1 to the horizontal, and an apex angle of substantially arctan 2×M1.

19. In a support bearing having a bore for receiving an axle element means, said bore having an upper surface section and a lower surface section, each said upper surface section and said lower surface section defining a middle portion thereof, the improvement comprising:

said middle portion of said upper surface section being substantially horizontal, and said middle portion of said lower surface section having a downward slope as a function of misalignment M, $f(M)$, wherein $f(M)$ is directly correlated with misalignment value M1, where M1 is misalignment caused by load-weight on said axle;

said downward slope of said middle portion of said lower surface section having a value of approximately 2×M1.

20. The support bearing having a bore for receiving a axle element means according to claim 19, wherein said middle portions are defined as the frustroconical section of a cone with an altitude having a slope of approximately 1×M1 to the horizontal, and an apex angle of approximately arctan 2×M1.

21. The support bearing having a bore for receiving an axle element means according to claim 19, in combination with a locomotive traction motor, said support bearing being used in mounting said traction motor to an axle-journal of a locomotive truck;

said support bearing being capable of mounting said traction motor to both the pinion end and commutator end, whereby said support bearing may be used interchangeably either at the heavily loaded PE position or the lightly loaded CE position without adversely bearing performance at said CE position.

* * * * *

UNITED STATES PATENT AND TRADEMARK OFFICE
CERTIFICATE OF CORRECTION

PATENT NO. : 7,178,463 B2 Page 1 of 1
APPLICATION NO. : 11/401177
DATED : February 20, 2007
INVENTOR(S) : Paul Bien et al.

It is certified that error appears in the above-identified patent and that said Letters Patent is hereby corrected as shown below:

TITLE PAGE:
    Insert -- (62) Related U.S. Application Data
    Continuation of application serial number 10/862,114, filed on June 3, 2004, now U.S. Patent No. 7,055,439. --.

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,178,463 B2
APPLICATION NO. : 11/401177
DATED : February 20, 2007
INVENTOR(S) : Paul Bien et al.

It is certified that error appears in the above-identified patent and that said Letters Patent is hereby corrected as shown below:

TITLE PAGE:
    Insert item (60) -- Related U.S. Application Data
        Continuation of application serial number 10/862,114, filed on June 3, 2004, now U.S. Patent No. 7,055,439. --.

Column 6:
    Line 50, "frustroconical" should read -- frustoconical --.

Column 7:
    Line 38, "the lower" should be deleted;
    Line 46, "frustroconical" should read -- frustoconical --;
    Line 51, "frustroconical" should read -- frustoconical --;
    Line 64, "upper surface" should read -- upper surface section --.

Column 8:
    Line 9, "frustroconical" should read -- frustoconical --;
    Line 26, "and said" should read -- and --;
    Line 48, "frustroconical" should read -- frustoconical --.

Column 9:
    Line 6, "frustroconical" should read -- frustoconical --.

UNITED STATES PATENT AND TRADEMARK OFFICE
CERTIFICATE OF CORRECTION

PATENT NO. : 7,178,463 B2
APPLICATION NO. : 11/401177
DATED : February 20, 2007
INVENTOR(S) : Paul Bien et al.

It is certified that error appears in the above-identified patent and that said Letters Patent is hereby corrected as shown below:

Column 10:
Line 17, "PE position" should read -- pinion end --;
Line 18, "CE position" should read -- commutator end --;
Line 19, "CE position" should read -- commutator end --.

Signed and Sealed this

Twenty-first Day of October, 2008

JON W. DUDAS
*Director of the United States Patent and Trademark Office*